Oct. 13, 1970 — R. S. PUCKETT — 3,533,293
DIFFERENTIAL PRESSURE TRANSDUCER
Filed Aug. 28, 1968 — 2 Sheets-Sheet 1

INVENTOR
ROBERT S. PUCKETT
BY Beaman & Beaman
ATTORNEYS

Oct. 13, 1970  R. S. PUCKETT  3,533,293

DIFFERENTIAL PRESSURE TRANSDUCER

Filed Aug. 28, 1968  2 Sheets-Sheet 2

INVENTOR
ROBERT S. PUCKETT
BY Beaman & Beaman

ATTORNEYS

United States Patent Office 3,533,293
Patented Oct. 13, 1970

3,533,293
DIFFERENTIAL PRESSURE TRANSDUCER
Robert S. Puckett, Albuquerque, N. Mex., assignor to Sparton Corporation, Jackson, Mich., a corporation of Ohio
Filed Aug. 28, 1968, Ser. No. 756,063
Int. Cl. G01i 13/02
U.S. Cl. 73—407                                2 Claims

ABSTRACT OF THE DISCLOSURE

A pressure sensing transducer utilizing a diaphragm capable of accurately and reliably measuring low differential pressures between two very high ambient or line pressures. The transducer utilizes a back-up support or limit for the diaphragm to prevent damage thereto in the event of over-pressurization, and a flexible membrane is utilized to insure accurate measurement by producing an accurate counter balance and an equalizing of the displacement force to produce extremely low hysteresis and high resolution.

BACKGROUND OF THE INVENTION

The invention pertains to the field of pressure transducers utilizing an axially movable, edge supported diaphragm wherein chambers are defined upon each side of the diaphragm subjected to the pressures to be compared, and sensing means are associated with the diaphragm to indicate the degree of axial movement of the diaphragm under the influence of the pressures acting thereupon.

Pressure transducers for comparing fluid or gas pressures are known. However, difficulty has been encountered in producing an accurate differential pressure transducer capable of sensing and resolving pressure differences between extremely high pressures, for instance, those in the 30,000–40,000 p.s.i. range. When operating in such high pressure ranges the possibility of damaging the transducer exists and the relatively sensitive elements employed, such as diaphragms, are often damaged due to instantaneous over-pressures which deform the diaphragm beyond its yield point, and thereby render the transducer ineffective and inaccurate.

SUMMARY OF THE INVENTION

The purpose of the invention is to provide a differential pressure transducer capable of accurately and reliably measuring low differential pressures occurring between high ambient or line pressures. For instance, it is a purpose of the invention to provide a transducer capable of accurately measuring a 10 to 15 p.s.i. pressure differential between pressures in the order of 30,000–40,000 p.s.i. where these pressure measurements provide for a 1% full scale accuracy. Thus, it is possible to provide an accurate measurement of 1 p.s.i. differential when gauging pressures of this very high range.

In the practice of the invention a casing is employed having a partition which includes an edge-supported, axially displaceable corrugated metallic diaphragm. A sensing member is attached to the diaphragm for indicating axial movement thereof, and pressure inlet means are associated with the casing chambers defined on the opposite sides of the diaphragm whereby the diaphragm may be subjected to the two pressures to be compared.

In order to prevent damage to the diaphragm due to over-pressurization, a unique diaphragm limiting stop or support is used which is capable of supporting the diaphragm in the event of over-pressurization and thereby prevent the diaphragm from being deformed beyond its elastic limit. The diaphragm support is constructed of a moldable material which, while in the moldable state, is engaged by the diaphragm and molded to have a surface disposed toward the diaphragm which exactly corresponds to the adjacent diaphragm face. Thus, after the moldable material hardens, a rigid support surface is disposed in spaced relationship to the diaphragm which exactly conforms to the diaphragm shape. Should the diaphragm be exposed to higher pressures than those normally encountered the diaphragm will intimately engage the hardened support surface throughout substantially all of the area of the diaphragm and damage thereto is prevented.

Additionally, the transducer includes a resilient membrane diaphragm communicating on one side with the low pressure chamber of the casing, and communicating upon the other side with the lower pressure to be compared, wherein the membrane is capable of movement with respect to the casing chamber and thereby produces a variable volume within the casing chamber without introducing additional frictional factors which would tend to give an inaccurate comparison of pressures.

In the disclosed embodiment, the aforementioned membrane is constructed of urethane and includes a cylindrical portion which may be twisted during assembly as to axially twist and untwist under the influence of the pressures acting thereon.

The casing chamber exposed to the "low" pressure side of the diaphragm, and exposed to the membrane, is preferably filled with a liquid, such as an oil having a high resistance to the compression. Thus, the transducer is capable of sensing either fluid or gaseous pressure without modification thereto and complete lubrication of the membrane is provided.

BRIEF DESCRIPTION OF THE DRAWINGS

The aforementioned objects and advantages will be apparent from a description of an embodiment as follows, and from the drawings wherein.

DESCRIPTION OF THE PREFERRED EMBODIMENT

Figure 1:
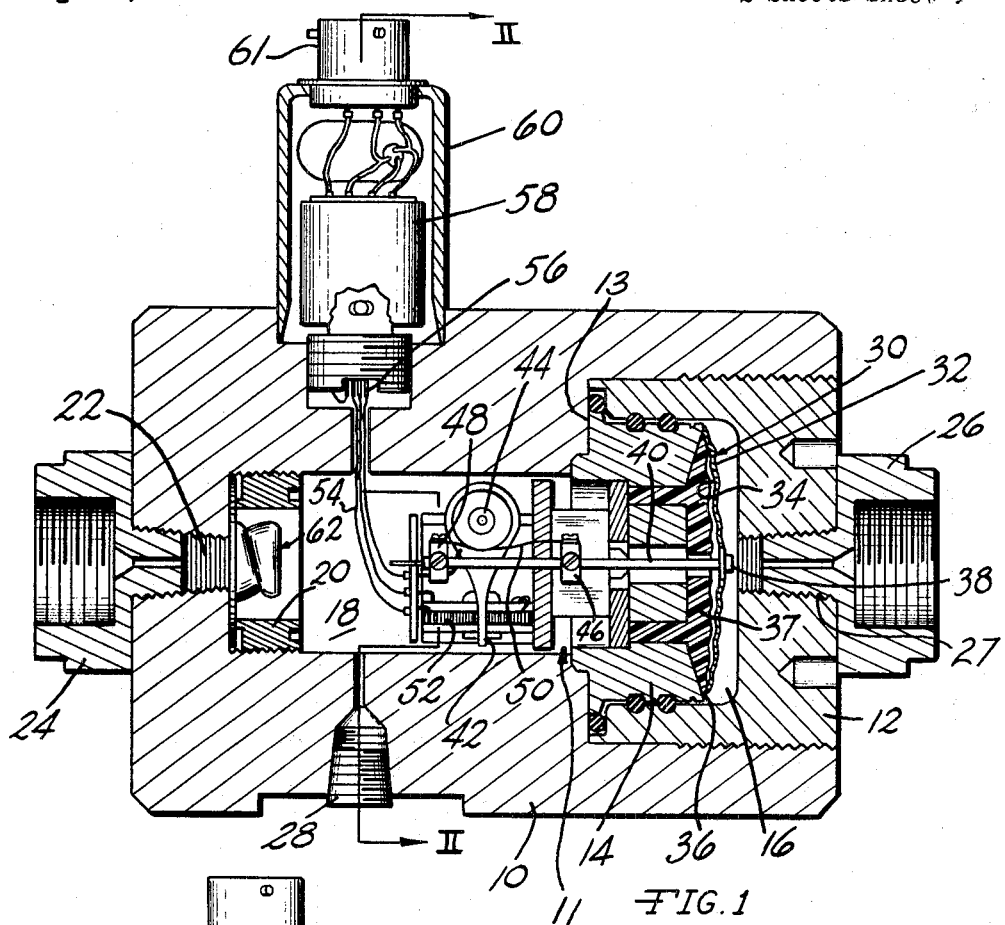
FIG. 1 is a diametrical view of a transducer for measuring differential pressures in accord with the invention.

An assembled differential pressure transducer in accord with the invention is illustrated in FIG. 1, and the relationship of the components will be appreciated from this figure.

The transducer includes a housing or casing 10 which may be of a cylindrical configuration and is provided with an internal chamber 11 having an enlarged threaded portion adapted to receive a plug 12, which encloses one end of the casing chamber. The plug 12 is adapted to sealingly engage the diaphragm partition or bushing 14 which is fitted against the shoulder 13 whereby the bushing 14 divides the casing chamber 11 into a high pressure portion 16 and a low pressure portion 18. Appropriate ring seals or O-rings are interposed between the plug 12 and the bushing 14 to insure a sealed relationship between the casing chamber portions 16 and 18.

An annular threaded nut or sleeve 20 is located at the left end, FIG. 1, of the casing chamber portion 18 for maintaining the flexible membrane diaphragm in place, as will be later described. A small chamber 22 is defined in the casing adjacent the sleeve 20, and a pressure inlet fitting for the lower pressure to be sensed is threaded into the casing at 24 for communication with the chamber portion 22. The high pressure casing inlet fitting 26 communicates with the casing chamber 16 through a threaded bore 27. A high pressure conduit may be affixed to the inlet fitting 26, and a low pressure conduit may be affixes to the fitting 24.

The casing chamber portion 18 is filled with a fluid having a high resistance to compression, and this fluid may be introduced into the chamber 18 through a casing passage which is normally sealed by the plug 28.

The pressure sensing element is in the form of a metallic diaphragm 30 which is affixed at its periphery to the bushing 14 in sealed relationship thereto. The diaphragm 30 may be formed of a number of materials such as Inconel 718, Ni-Span C stainless steel, or the like, and is preferably of a circular configuration having concentric corrugations defined about the axis of the diaphragm. The diaphragm includes an outer or high pressure exposed face 32, and an inner or low pressure exposed face 34. The diaphragm is affixed to the bushing 14 by welding the diaphragm to the bushing at its periphery as at 36. Electron beam welding is preferably employed to insure a high quality bond and sealed connection.

Figure 3:
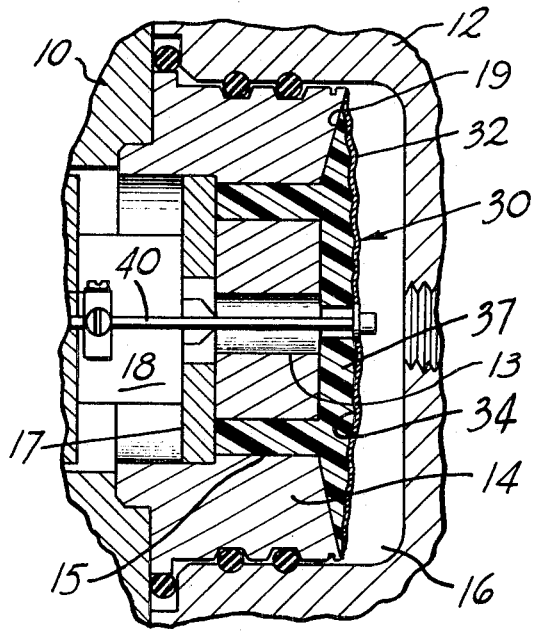
FIG. 3 is an enlarged, detailed, elevational, sectional view of the diaphragm and support therefor illustrating the relationship under an over-pressure condition.

The bushing 14 is provided with an axially extending bore 13, and includes at least two holes 15 extending parallel to the bushing axis, and offset with respect thereto. The holes 15 communicate with a recess 19 defined in the bushing having a conical recessed surface. A sealing member 17 is interposed adjacent the left ends of the holes 15, FIG. 3, in the assembled relationship.

A hardened molded material 37 is received within the bushing recess 19, and forms the limit and support for the diaphragm 30 under over-pressurization conditions. As will be explained in detail later, the material 37 includes an outer face 39 disposed toward the diaphragm face 34 which is of a configuration exactly conforming to the configuration of the diaphragm face 34.

Figure 2:
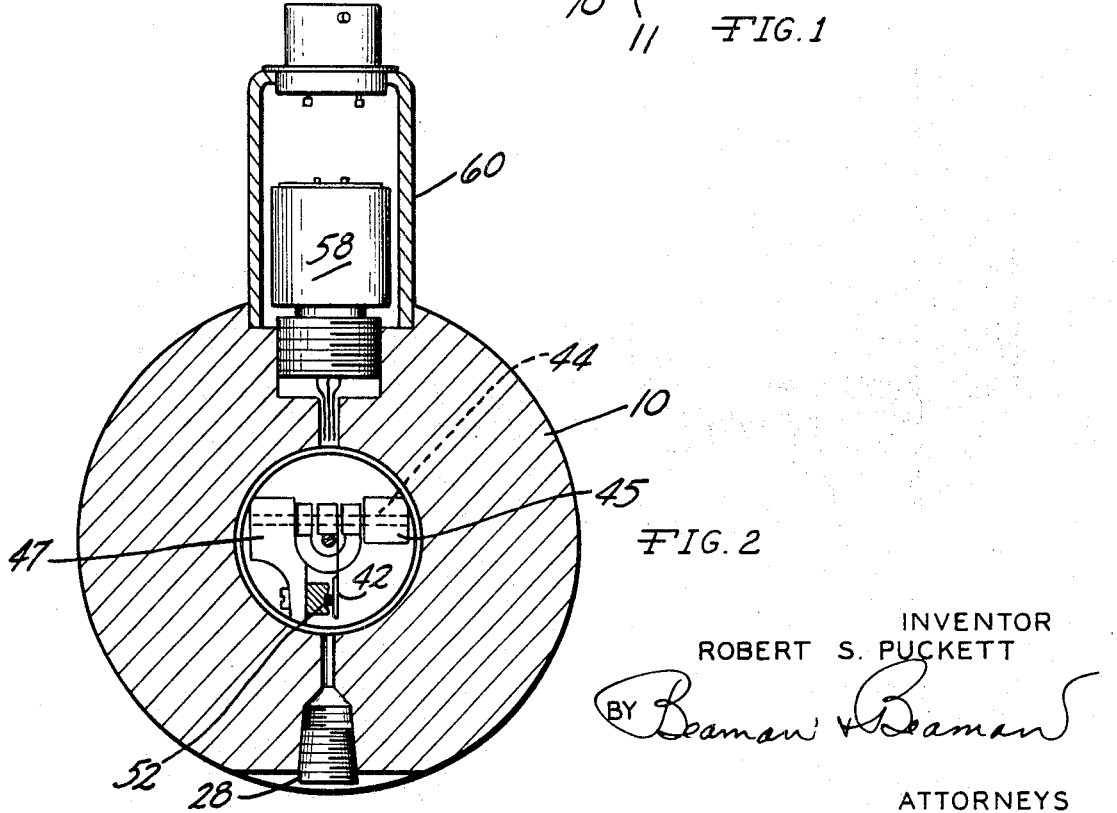
FIG. 2 is an elevational section view of the transducer as taken along Section II—II of FIG. 1.

A shaft 40 is affixed to the diaphragm 30 at the center axial location thereof, and the shaft 40 extends coaxial with the diaphragm axis into the casing chamber 18. As will be apparent, the shaft 40 extends through the bore 13 defined in the bushing 14 and through the sealing member 17. The shaft 40 is used to operate a potentiometer tap 42 which is rotatably mounted upon the casing 10 by means of a shaft 44 rotatably supported within bearing elements 45 and 47, FIG. 2. The shaft 40 is connected to the tap 42 by means of adjustable strap anchors 46 and 48 mounted on the shaft 40 by means of a bore through which the shaft extends and set screws bearing upon the shaft. The strap anchors 46 and 48 are used to interconnect the ends of a strap 50 to the shaft 40. The strap 50 extends about a drum defined upon the tap 42 in a manner similar to that shown in the assignee's U.S. Pat. 3,346,830 which provides an amplification of linear to rotary motion rendering the transducer very sensitive to diaphragm movement.

The tap 42 engages a resistance coil 52 and appropriate conductors 54 are used to electrically place the tap and resistance coil into the desired electric circuit. The conductors 54 are attached to the terminals 56 defined in the capsule element 58 which is located within the housing 60 extending from the casing 10. Appropriate electrical connectors extend from the capsule 58 to the terminal block 61 which may be electrically connected with the desired circuit in any conventional manner.

Volume changes occurring within the chamber portion 18 due to a pressure equilibrium being established during a comparison of pressures being sensed are compensated for by a flexible membrane 62 interposed between chambers 18 and 22. The membrane 62 is sealingly affixed at its periphery 68 to the casing by the threaded nut 20.

Figures 4, 5:
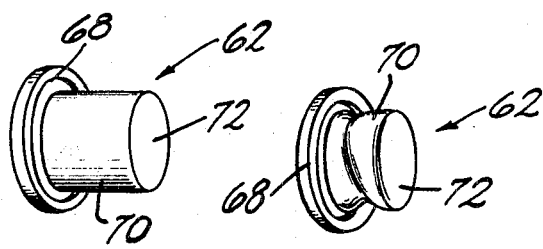
FIG. 4 is a perspective view of the flexible membrane diaphragm used in accord with the invention.
FIG. 5 is a perspective view of the membrane diaphragm illustrating the cylindrical portion being distorted into a twisted configuration.

With reference to FIGS. 4 and 5, the desired configuration of flexible membrane is illustrated, and this membrane includes an annular periphery 68 from which extends the cylindrical portion 70 terminating in the closed wall 72. When installing the flexible membrane in the casing 10 the cylindrical portion 70 is twisted about its axis whereby a configuration similar to that shown in FIGS. 1 and 5 is produced.

The membrane 62 may be formed of several types of flexible material, and polyurethane has been found very suitable. As the volume within the chamber 18 fluctuates as the pressure equilibrium is sought the twisted portion 70 will twist and untwist due to the natural resiliency of the membrane material and thereby effectively permit a comparison of pressures without adversely affecting the pressure balance, or introducing resistance factors into the transducer.

In operation, a fluid having a high resistance to compression, such as Dow Corning oil D300, is introduced into the chamber 18 and the chamber is completely filled with oil such that no air voids exist. A conduit, not shown, is attached to the fitting 26 which communicates with the higher pressure to be sensed. A second conduit, not shown, is attached to the fitting 24 which communicates with the lower pressure to be sensed. The transducer of the invention, can be used for gauging pressure differentials in many applications, for instance across gas line pumps, filters, and other components and numerous other types of applications wherein the pressure differential to be sensed is not extremely great, but the pressure themselves are of a high order. The transducer, in one commercial embodiment, is capable of sensing up to a 300 lb. pressure differential, and the pressures to be sensed can be of a range as high as 30,000 to 40,000 p.s.i.

Upon the chamber 16 being exposed to the high pressure to be sensed communicating with the inlet fitting 26 the natural or "at rest" condition of the diaphragm 30 as represented in FIG. 1 will be affected in that a higher pressure will be exposed to face 32 than is being exposed to face 34. The low pressure to be sensed will enter chamber 22 and communicate with the interior of the flexible membrane portion 70, in that the interior of this membrane portion communicates with the chamber 22. Thus, the fluid pressure within chamber 18 will correspond to the pressure in chamber 22, and the existence of the membrane 62 permits either fluids or gasses to be sensed, and retains the fluid within the chamber 18 and prevents mixing thereof with the pressurized medium within chamber 22.

In order to take a pressure comparison it is necessary that a unidirectional valve, such as a check valve, be associated with the conduit communicating with fitting 24 such that the movement of the diaphragm 30 toward the left, FIG. 1, will cause the pressure within chamber 18 to rise and equalize with respect to the pressure within chamber 16. Axial displacement of the diaphragm 30 is necessary to produce this equalizing of pressure upon the diaphragm faces 32 and 34 and this diaphragm displacement is sensed by the tap 42 to produce an electrical resistance through the transducer which may be measured by a readout mechanism electrically connected to the transducer through the terminal block 61, and thereby produce an electrical signal capable of representing the differential pressures originally existing in the chamber 16 and the chamber 18, which permits an evaluation between the pressures in the conduits communicating with the fittings 24 and 26.

Should the pressure to which the diaphragm face 32 is exposed be greater than that within the chamber 18 to such an extent that the diaphragm 30 is moved toward the left a distance which would stretch the diaphragm beyond the elastic limit of its material, such an occurrence is prevented by the engagement of the diaphragm surface 34 with the surface 39 of the diaphragm support material 37. In that the surface 39 exactly corresponds to the configuration of the diaphragm surface 34 the diaphragm will be fully supported throughout substantially all of its surface 34 and be thereby protected against undue and excessive deformation which could damage the transducer and render it inoperable. The full engagement of surface 39 with the diaphragm surface 34 insures that the diaphragm will not be damaged regardless of the pressure existing on the opposite side of the diaphragm.

Figure 6:
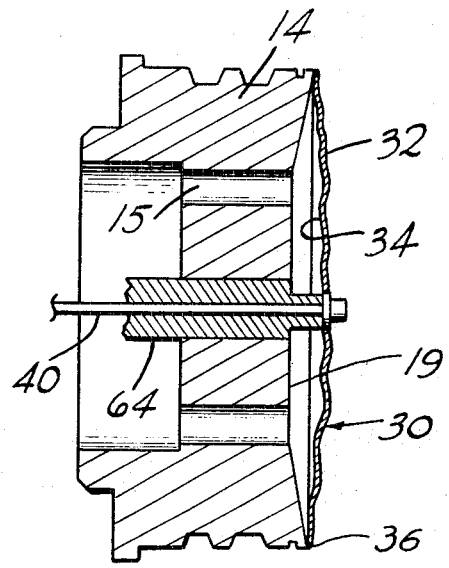
FIG. 6 is a diametrical, elevational, sectional view of the diaphragm mounting bushing illustrating the bushing prior to the diaphragm support material being introduced therein.
Figure 7:
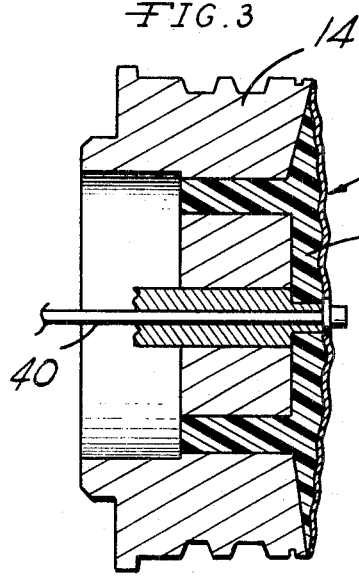
FIG. 7 is an elevational, sectional view similar to FIG. 6 illustrating the relationship of the components on introduction of the diaphragm support material into the diaphragm bushing and pressurization of the diaphragm.
Figure 8:
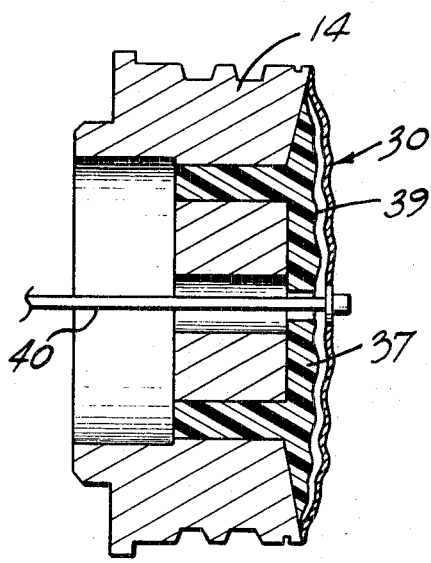
FIG. 8 is a view similar to FIG. 7 illustrating the relationship of the components upon the over-pressure exerted upon the diaphragm being released.

The method for forming the diaphragm support or back-up member 37 is best understood with reference to FIGS. 6 through 8. In these figures the bushing 14 is illustrated in an enlarged manner and FIG. 6 represents the bushing prior to the insertion of the material 37 and after the diaphragm 30 has been affixed to the bushing at its periphery. At this time a sleeve 64 is slipped over the shaft 40 to act as a form adjacent shaft 40 in order to fully encapsulate the moldable material received within the recess 19.

Upon the bushing, diaphragm and shaft being assembled as in FIG. 6 the outer diaphragm surface 32 is exposed to a pressure which will axially deflect the diaphragm to the left, FIG. 7, to a position which does not exceed the yield point of the material, and is within the safe operating limits of the diaphragm material. At this time a moldable material is inserted into the recess 19 through the holes 15. This material, which constitutes the support member 37, may be a moldable liquid metal, an epoxy, synthetic resin or plastic material, or the like, which is moldable, yet is capable of hardening into a strong rigid mass. The material 37 is introduced into the recess 19 to fill the same, and the bushing 14 may be rapidly rotated about the axis of the shaft 40 to impose centrifugal forces upon the material 37 to insure that it flows radially outward to completely fill the the recess 19 between the diaphragm surface 34 and the bushing 14. The diaphragm is maintained in the position of FIG. 7 under pressure until the material 37 has hardened. Any excess material extending from the holes 15 is removed.

After the material 37 has hardened the pressure upon the diaphragm 30 is removed, the sleeve 64 is removed, and the diaphragm will return to its normal or "at rest" position represented in FIGS. 8 and 1. The bushing 14, and the associated diaphragm and shaft structure can now be assembled into the casing 10 in the manner shown in FIG. 1.

The aforedescribed process for forming the diaphragm support 37 insures that an intimate and full support of the diaphragm exists upon over-pressurization of the chamber 16, and the diaphragm is thereby protected under all circumstances. As each support 37 for each transducer is "custom molded" to its particular diaphragm the full and complete support of the diaphragm desired is insured.

It is appreciated that various modifications to the described embodiment may be apparent to those skilled in the art without departing from the spirit and scope thereof and it is intended that the invention be defined only by the following claims.

What is claimed is:

1. A differential pressure transducer comprising, in combination, a housing having a chamber defined therein, a partition located within said chamber having a periphery sealed with respect to said chamber and dividing said chamber into first and second portions, first pressure inlet means defined in said casing communicating with said chamber first portion, a first face surface defined on said partition disposed toward said chamber first portion, a recess formed in said first face surface having a periphery concentric with the periphery of said partition, a diaphragm support of hardenable molded material filling said recess and having a molded surface disposed toward said chamber first portion, a flexible diaphragm having a periphery and first and second faces, said diaphragm periphery being sealingly connected to said partition at the periphery of said recess whereby said diaphragm second face is disposed toward said diaphragm support molded surface, said diaphragm support molded surface corresponding in configuration to the configuration of said diaphragm second face and spaced therefrom under normal operation of said diaphragm and limiting axial displacement of said diaphragm toward said partition and second chamber portion, said diaphragm first face communicating with said chamber first portion, removable means defined on said casing concentric with the partition and diaphragm assembly providing access thereto, said first pressure inlet means being defined in said removable means, sensing means located in said chamber second portion connected to said diaphragm sensing axial movement thereof, a substantially incompressible liquid filling said chamber second portion and communicating with said diaphragm second face, a second pressure inlet defined in said casing, and a flexible non-metallic membrane between said second pressure inlet and said second chamber portion adapted to impose a pressure upon the fluid within said chamber second portion and said diaphragm second face.

2. In a differential pressure transducer as in claim 1, said membrane including a cylindrical portion having an axis extending into said casing second chamber portion, said cylindrical portion being spirally twisted about its axis prior to filling of said chamber portion with liquid whereby said cylindrical portion is capable of axial displacement as the volume of the liquid within said casing chamber second portion varies.

References Cited

UNITED STATES PATENTS

| | | | |
|---|---|---|---|
| 2,376,634 | 5/1945 | Tellkamp | 92—91 |
| 2,879,802 | 3/1959 | Du Bois | 73—410 XR |
| 3,390,579 | 7/1968 | Glattenberg et al. | 73—410 XR |

FOREIGN PATENTS

| | | |
|---|---|---|
| 819,538 | 9/1959 | Great Britain. |

DONALD O. WOODIEL, Primary Examiner

U.S. Cl. X.R.

73—398, 406